(12) United States Patent
Croak et al.

(10) Patent No.: US 8,705,401 B1
(45) Date of Patent: Apr. 22, 2014

(54) METHOD AND APPARATUS FOR VALIDATING COMMANDS FOR VOIP NETWORK COMPONENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1850 days.

(21) Appl. No.: 11/003,801

(22) Filed: Dec. 3, 2004

(51) Int. Cl.
*H04L 12/28* (2006.01)

(52) U.S. Cl.
USPC ............ 370/254; 370/255; 709/220; 709/221; 709/222; 709/223; 709/224; 709/225; 709/226

(58) Field of Classification Search
CPC ... H04L 41/00; H04L 41/022; H04L 41/0246; H04L 41/0631; H04L 41/0636; H04L 41/065; H04L 41/08; H04L 41/0803; H04L 41/28; H04L 41/0866; H04L 41/0813
USPC .......... 370/352, 254, 255; 709/223, 230, 217, 709/218, 219, 220, 221, 222, 224, 225, 226
See application file for complete search history.

(56) References Cited

U.S. PATENT DOCUMENTS

| | | | |
|---|---|---|---|
| 5,764,955 A * | 6/1998 | Doolan .................... | 709/223 |
| 2003/0074463 A1* | 4/2003 | Swartz et al. ............ | 709/230 |
| 2004/0095897 A1* | 5/2004 | Vafaei ...................... | 370/254 |
| 2004/0103220 A1* | 5/2004 | Bostick et al. ........... | 709/253 |
| 2005/0249225 A1* | 11/2005 | Singhal .................... | 370/401 |

* cited by examiner

*Primary Examiner* — Ayaz Sheikh
*Assistant Examiner* — Tarell Hampton (57) ABSTRACT

The invention comprises a method and apparatus for validating at least one command. Specifically, the method comprises receiving the at least one command, wherein the at least one command is associated with at least one command source, processing the at least one command for determining at least one network component for which the at least one command is destined, and validating the at least one command according to at least one attribute, wherein the at least one attribute is associated with at least one of the at least one network component, the at least one command source, and the at least one command.

18 Claims, 4 Drawing Sheets

METHOD AND APPARATUS FOR VALIDATING COMMANDS FOR VOIP NETWORK COMPONENTS

FIELD OF THE INVENTION

The invention relates to the field of communication networks and, more specifically, to validating commands issued to network components.

BACKGROUND OF THE INVENTION

In order to maintain the operation of a voice-over-Internet-Protocol (VOIP) network, a service provider typically employs teams of network technicians for entering service orders, managing network inventory, provisioning service, monitoring network performance, maintaining network operation, performing network upgrades and network services upgrades, and for performing like activities. Unfortunately, providing such well-intentioned users access to production VOIP network components may result in significant problems (e.g., loss of service, degraded network performance, and the like) due to a variety of factors. For example, a user with access (e.g., read/write) to VOIP network components may unknowingly reconfigure particular network component parameters, incorrectly modify complex software, accidentally modify network service functions, and the like, resulting in associated network problems.

In the current paradigm, service providers typically provide network technicians with logins and passwords associated with each of the individual network components, such as network elements (e.g., core routers, edge routers, and the like), service elements (e.g., network routing engines, user profile engines, and the like), and like network components. As such, each of the network technicians has direct, unsupervised access to at least a portion of the network components. Given the likelihood of unintentional human error, especially in light of the increasing complexity of telecommunications systems, such a paradigm of unsupervised access by network technicians to production networks exposes service providers to substantial risks.

Accordingly, a need exists in the art for a method and apparatus for controlling access to production network components and for validating actions performed by authenticated users on those network components.

SUMMARY OF THE INVENTION

In one embodiment, the invention comprises a method and apparatus for validating at least one command. Specifically, the method comprises receiving the at least one command, wherein the at least one command is associated with at least one command source, processing the at least one command for determining at least one network component for which the at least one command is destined, and validating the at least one command according to at least one attribute, wherein the at least one attribute is associated with at least one of the at least one network component, the at least one command source, and the at least one command.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention is discussed in the context of an Internet Protocol (IP) network architecture; however, the methodology of the invention can readily be applied to other network architectures. An IP network is broadly defined as a network that uses Internet Protocol to exchange data packets. A VOIP network is broadly defined as a network that is capable of carrying voice signals as packetized data over an IP network. In general, the present invention enables a service provider to control access to packet-switched network components (e.g., VOIP network components), and to monitor actions performed (e.g., commands executed) on VOIP network components.

A command may be broadly defined as at least one instruction to a computer, device, and the like components for performing at least one specific task. As such, a command source may be broadly defined as at least one of a computer, device, and like components from which a command may be received. A network component may be broadly defined as a component (e.g., a server, a computer, a router, a database, a switch, a processor, and the like) associated with a network that may receive and process at least one command.

The methodologies of the present invention obviate the need for a service provider to maintain separate logins and passwords for the multitude of network components in a VOIP network. Similarly, the present invention obviates the need for a service provider (e.g., a network technician, a system, and the like) to login to each network component in a VOIP network in order to execute a command on that network component. Furthermore, the present invention ensures that service provider network technicians are unable to execute invalid commands (e.g., disallowed commands, commands comprising incorrect syntax, and the like) on VOIP network components.

Figure 1:
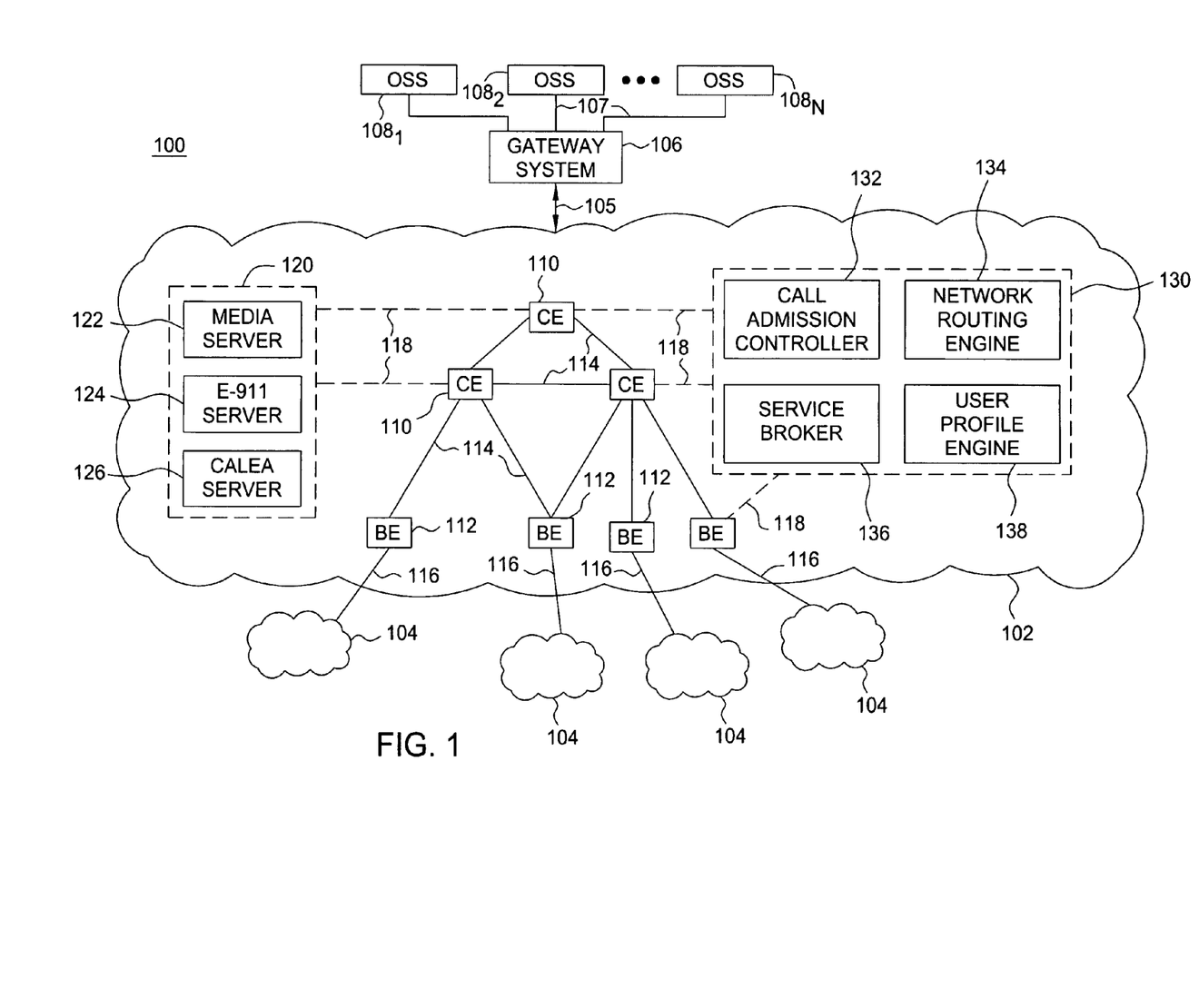
FIG. 1 depicts a high level block diagram of an Internet Protocol network architecture.

FIG. 1 depicts a high level block diagram of an Internet Protocol network architecture. Specifically, network architecture 100 of FIG. 1 comprises IP network 102, a plurality of access networks (ANs) 104 (collectively, ANs 104), a gateway system (GS) 106, and a plurality of operations support systems (OSSs) $108_1$-$108_N$ (collectively, OSSs 108). The IP network 102 comprises a plurality of core elements (CEs) 110 (collectively, CEs 110), a plurality of border elements (BEs) 112 (collectively, BEs 112), a plurality of resource servers (RSs) 120 (collectively, RSs 120), and a plurality of service elements (SEs) 130 (collectively, SEs 130). The CEs 110, BEs 112, RSs 120, and SEs 130 are collectively denoted as network components.

In general, the CEs 110 comprise network elements (such as routers, switches, and the like) over which network traffic is carried between the BEs 112. In one embodiment, at least a portion of the CEs 110 may comprise call control elements (CCEs) for managing and interacting with the BEs 112 (including monitoring the congestion level of the BEs 112), setting up and tearing down call legs in the IP network 102, enforcing various routing policies, instructing the BEs 112 to redirect media channels associated with a particular call to a different destination, communicating with other IP networks (not depicted), and providing like functionality.

The BEs 112 may comprise network elements (such as routers, switches, and the like) through which access networks (illustratively, ANs 104) and associated network endpoints connect to a service provider network (illustratively, IP network 102). In one embodiment, the BEs 112 may perform functions such as routing, call admission control (CAC), media control, security, signaling, and the like. For example, a BE may translate between SIP and a variety of access protocols, enforce security to prevent unauthorized access to the IP network 102, enforce admission policies in accordance with CAC (such as call gapping, call limiting, bandwidth management, and the like), detect Dual Tone Multi-Frequency (DTMF) and similar in-band user requests, examine media streams, redirect media streams in response to instructions from a CE, and the like.

In one embodiment, at least one of the BEs 112 may comprise a network gateway BE for controlling traffic between a circuit-switching network and packet-switching IP network 102. In one such embodiment, the associated AN 104 with which the network gateway BE communicates may comprise a Signaling System Seven (SS7) network, an Incumbent Local Exchange Carrier (ILEC) network, a time division multiplexing (TDM) network (including private branch exchanges (PBXs), Series Four (4E) switches, Series Five (5E) switches, and the like), and like circuit-switched networks. As such, a network gateway BE may provide all required Publicly Switched Telephone Network (PSTN) functions, including SS7 signaling, media conversion, and the like, and may operate as a Session Initiation Protocol (SIP) user agent from the perspective of the CEs 110.

In one embodiment, at least one of the BEs 112 may comprise a Media Gateway Control Protocol (MGCP) BE for controlling traffic between a MGCP network and IP network 102. In general, MGCP comprises a signaling standard for the conversion of audio signals to data packets carried over the Internet or other packet networks. In one such embodiment, the associated AN 104 with which the MGCP BE communicates may comprise a PSTN, a Digital Subscriber Line (DSL) network, a cable network, and like networks comprising terminal adapters (TAs), media terminal adapters (MTAs), IP user terminals (e.g., IP phones, computers, and the like), and like components. As such, a MGCP BE may provide various functions required for converting circuit-based voice traffic for transport across IP network 102, and may operate as a SIP user agent from the perspective of the CEs 110.

In one embodiment, at least one of the BEs 112 may comprise a SIP BE for controlling traffic between SIP-based networks and the IP network 102. In one such embodiment, the associated AN 104 with which the SIP BE communicates may comprise a DSL network, a cable network, an enterprise customer local area network (LAN), a partner IP network, and like networks comprising IP user terminals. As such, a SIP BE may implement SIP proxies, provide back-to-back user agent (B2BUA) functions for SIP devices, and provide like functions.

In one embodiment, at least one of the BEs 112 may comprise a H.323 BE for controlling traffic between H.323 customer premise equipment (CPE) gateway networks and IP network 102. In one such embodiment, the associated AN 104 with which the H.323 BE communicates may comprise a partner IP network, an enterprise customer network comprising at least one of a customer managed gateway, a managed gateway, a managed router, and like networks comprising IP user terminals. As such, a H.323 BE may provide gatekeeper-routed signaling from the access side, and may operate as a SIP user agent from the perspective of the CEs 110.

As depicted in FIG. 1, the RSs 120 comprise a media server 122, an E-911 server 124, and a CALEA server 126. The media server 122 may handle and terminate media streams, providing functions such as announcement, DTMF, text-to-speech (TTS), automatic speech recognition (ASR), call bridging, and like functionality. The E-911 server 124 may route emergency calls to appropriate Public Safety Answering Points (PSAPs). The CALEA server 126 may intercept various communications for law enforcement and other purposes, providing a capability to identify and collect the content of voice calls.

As depicted in FIG. 1, the SEs 130 comprise a call admission controller (CAC) 132, a network routing engine (NRE) 134, a service broker (SB) 136, and a user profile engine (UPE) 138. The CAC 132 may provide network-wide admission policy enforcement, including capacity management, congestion control, firewall restriction control, service level agreement (SLA) interpretation, network address translation (NAT), and like functionality. The NRE 134 may provide route information to the CEs 110 and BEs 112 that is required for establishing call legs between source and destination BEs. The NRE 134 may translate network addresses to IP addresses, and may maintain a database comprising lists of BEs through which a user may be reached. The SB 136 may provide addresses to CEs operating as CCEs, and may maintain subscriber service information using a database of installed and activated services. The UPE 138 maintains static and dynamic user profiles comprising user data, such as registered devices, presence information, geographic location information, and like user data.

Although three RSs and four SEs are depicted and described herein, those skilled in the art will appreciate that fewer or more RSs and SEs may be utilized by IP network 102 (hosted within IP network 102 and in communication with IP network 102) for providing various IP-based services. Similarly, although depicted as communicating with a portion of the CEs 110 and BEs 112, each of the RSs 120 and SEs 130 may communicate with other network components within IP network 102, with the access networks 104, and with other networks and network components (not depicted). Furthermore, although depicted as physically centralized, it should be noted that at least a portion of the RSs 120 and SEs 130 may be physically and/or logically distributed across a variety of systems.

As depicted in FIG. 1, the CEs 110 and the BEs 112 communicate via a plurality of core communication links 114, and the BEs 112 communicate with the ANs 104 via a respective plurality of communication links 116. Although not depicted, it should be noted that each of the CEs 110 may maintain respective SIP sessions with each of the BEs 112. Similarly, as depicted in FIG. 1, the RSs 120 and SEs 130 maintain SIP sessions 118 with a portion of the CEs 110 and BEs 112. Although specific combinations of communications links and SIP sessions are depicted, those skilled in the art will appreciate that fewer or more communication links and SIP sessions may be used, and that the various network components and access networks may communicate via other associated networks and network equipment (not depicted).

An OSS 108 may comprise any system capable of accessing at least one network component. For example, each of the OSSs 108 may comprise at least one of a service order system, an inventory system, a configuration system, a provisioning system, a management system, a monitoring system, an alarm system, a billing system, and like systems requiring access to communication network components. As depicted in FIG. 1, each of the OSSs 108 communicates with GS 106 via a respective plurality of communication links 107. Although one respective communication link 107 is depicted for each of the OSSs 108, those skilled in the art will appreciate that each OSS 108 may communicate with GS 106 via additional communication links and associated networks and network equipment.

As depicted in FIG. 1 and described herein, GS 106 operates as a gateway by which the OSSs 108 may access network components (e.g., CEs 110, BEs 112, RSs 120, SEs 130, and like network components) associated with IP network 102. As such, in one embodiment, at least a portion of the methodologies of the present invention may be performed by GS 106, such as command source authentication, command validation, and like functionality. As depicted in FIG. 1, GS 106 communicates with IP network 102 via communication link 105. Although one communication link 105 is depicted, those skilled in the art will appreciate that GS 106 may communicate with IP network 102 via additional communication links and associated network equipment.

Although a specific network topology is depicted and described with respect to FIG. 1, those skilled in the art will appreciate that the IP network architecture 100 of FIG. 1 may be implemented using a variety of network topologies without deviating from the scope of the present invention. As such, although specific numbers of CEs 110, BEs 112, RSs 120, SEs 130, ANs 104, and OSSs 108 are depicted and described with respect to FIG. 1, it should be noted that fewer or more CEs 110, BEs 112, RSs 120, SEs 130, ANs 104, and OSSs 108 may be deployed. Similarly, although one GS 106 is depicted, a plurality of GSs may be employed for implementing the methodologies of the present invention.

Figure 2:
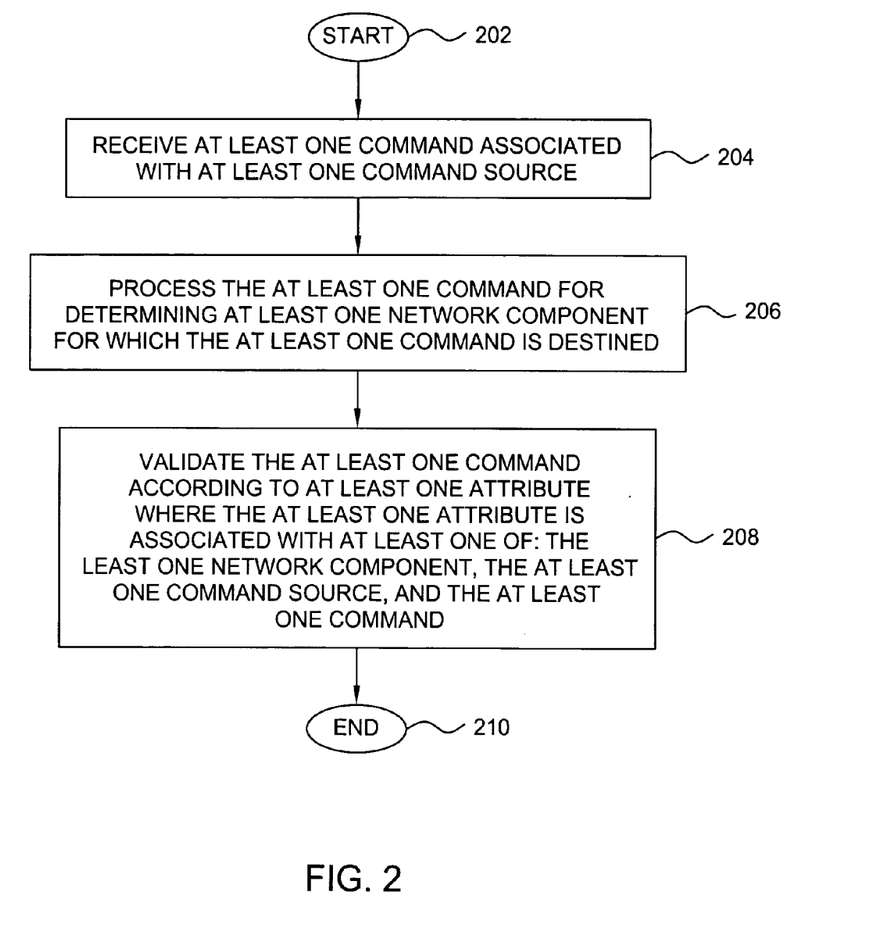
FIG. 2 depicts a flow diagram of a method according to one embodiment of the invention.

FIG. 2 depicts a flow diagram of a method according to one embodiment of the invention. Specifically, method 200 of FIG. 2 comprises a method for validating at least one command. The method 200 is entered at step 202 and proceeds to step 204. At step 204, at least one command is received, wherein the at least one command is associated with at least one command source. At step 206, the at least one command is processed for determining at least one network component for which the at least one command is destined. At step 208, the at least one command is validated according to at least one attribute. In one embodiment, the at least one attribute is associated with at least one of the at least one network component, the at least one command source, and the at least one command. The method 200 then proceeds to step 210 where method 200 ends.

Figure 3:
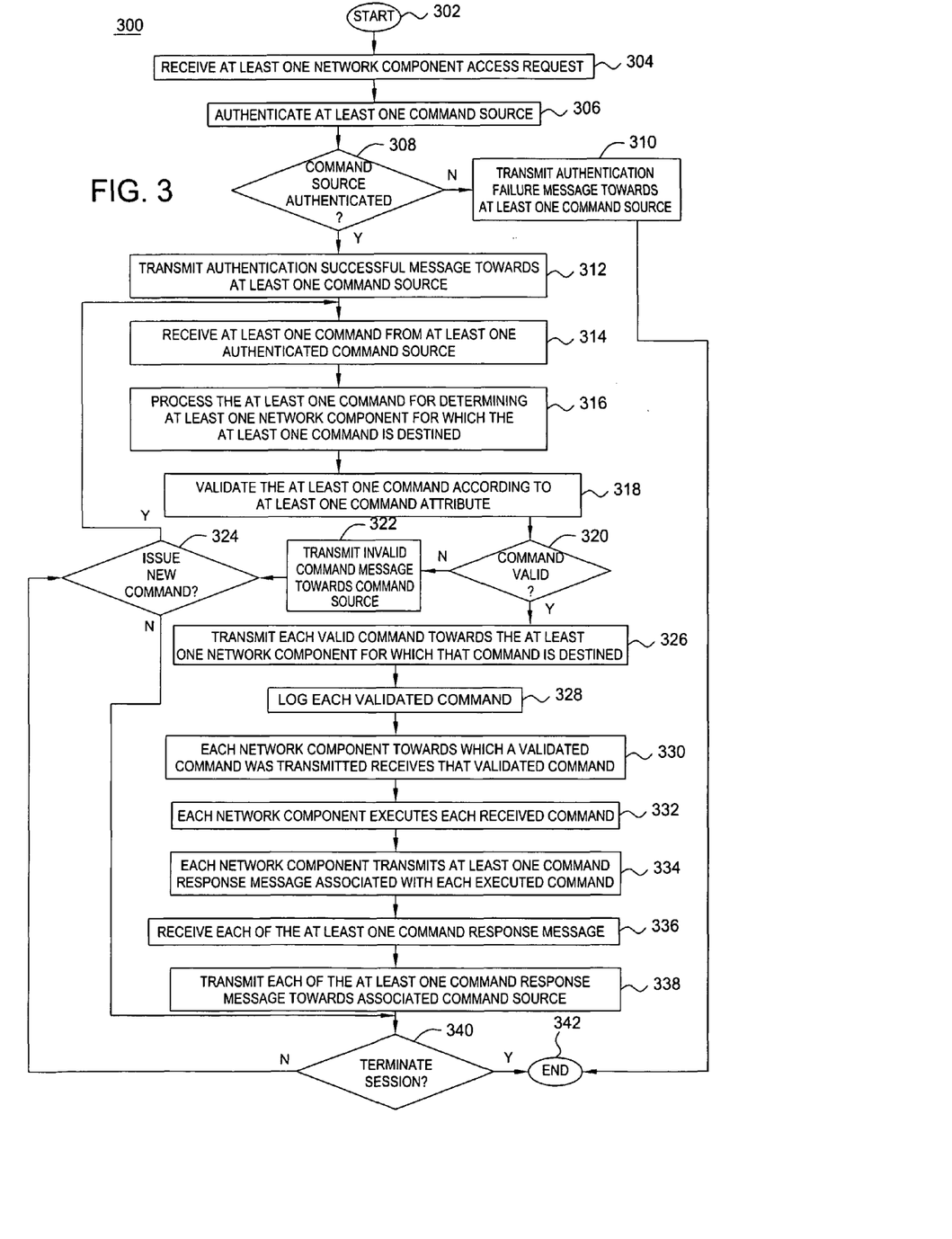
FIG. 3 depicts a detailed flow diagram of the method depicted in FIG. 2.

FIG. 3 depicts a detailed flow diagram of the method depicted in FIG. 2. As such, a single step as depicted in FIG. 2 may correspond to multiple steps as depicted in FIG. 3. Specifically, method 300 of FIG. 3 comprises a method for validating at least one command. Although depicted as being performed serially, those skilled in the art will appreciate that at least a portion of the steps of method 300 may be performed contemporaneously. The method 300 is entered at step 302 and proceeds to step 304.

At step 304, at least one network component access request is received. In one embodiment, each of the at least one network component access request may be received from at least one command source. For example, with respect to FIG. 1, a network component access request may be received by GS 106 from one of the OSSs 108. In one embodiment, a network component access request may comprise at least one login and at least one corresponding password. In another embodiment, a network component access request may comprise at least one identifier (e.g., a target identifier, an IP address, and the like) associated with the network component to which access is requested.

In one embodiment, a network component access request may be initiated automatically by a command source. For example, a command source system may automatically initiate a cron job (i.e., an automated process that operates at predefined time intervals) for accessing at least one network component, and issuing commands for configuring the at least one network component. In another embodiment, a network component access request may be initiated manually by a user via a user interface associated with the command source. For example, a user may enter a login and password in respective entry fields, and then select a "LOGIN" button from the user interface, thereby initiating creation and transmission of a network component access request.

At step 306, the at least one command source associated with the at least one received network component access request is authenticated. In one embodiment, the authentication of a command source is performed according to at least one associated authentication parameter (e.g., an IP address, a login, a password, and like parameters). For example, in one embodiment, in which the network component access request comprises a login and password, the received login and password may be used to search at least one authentication database table comprising valid logins and associated passwords.

In one such embodiment, the login and password may be associated with a system (illustratively, one of the OSSs 108) such that any user with access to that system (i.e., command source) may be able to request access to at least one network component. In another such embodiment, the login and password may be associated with a specific user of that system such that each user with access to that system may be authenticated separately. For example, a single OSS 108 may be accessible through a plurality of terminals such that a single command source may establish a plurality of sessions (corresponding to a respective plurality of users) with the GS 106.

At step 308, a determination is made as to whether the at least one command source (e.g., an OSS 108, a user utilizing an OSS 108, and the like) has been authenticated. If the command source is not authenticated (and is therefore denied access to the network components), method 300 proceeds to step 310. At step 310, an authentication failure message is transmitted towards the command source from which the failed network component access request was received, and method 300 then proceeds to step 342 where method 300 ends. If the command source is authenticated (and is therefore provided with access to the network components), method 300 proceeds to step 312.

At step 312, an authentication success message is transmitted towards each command source from which each of the successful network component access requests was received. In one embodiment, an authentication success message indicates successful establishment of a session between a command source and the GS 106. As such, authentication success messages operate to notify a command source that at least one corresponding command may be issued to at least one network component.

At step 314, at least one command is received from the at least one authenticated command source. In one embodiment, a command may comprise at least one request associated with at least one corresponding network component. In one embodiment, a command may comprise at least one of a read command (e.g., a database query command, a network routing rules retrieval command, a router configuration retrieval command, and like read commands), a write command (e.g., a software upgrade command, a user profile engine database storage command, a router configuration change command, and like write commands), and like commands as known in the art.

In one example, a command may comprise a query for retrieving a particular router configuration from each of the CEs 110. In another example, a command may comprise instructions for storing a router configuration change on each of the BEs 112. In another example, a command may comprise executing a software upgrade for enhancing the ASR functionality of the media server 122. In another example, a command may comprise storing an updated mapping table (specifying mappings between caller location and associated PSAPs) on the E-911 server 124. In another example, a command may comprise a query for retrieving stored, intercepted communications from the CALEA server 126.

In another example, a command may comprise instructions for executing a plurality of configuration changes for modifying the firewall restrictions and congestion control software of CAC 132. In another example, a command may comprise a configuration to be applied to the NRE 134 for modifying the rules utilized for distribution of route information within the IP network 102. In another example, a command may comprise loading a file of updated subscriber service information for updating a database of installed and activated services maintained on SB 136. In another example, a command may specify a query for retrieving user profile information from UPE 138.

At step 316, each received command is processed for determining at least one network component for which the at least one command is destined. In one embodiment, the at least one network component may be determined from a header associated with the command. In another embodiment, the at least one network component may be determined from syntax associated with at least one command (e.g., from an IP address parameter, a target identifier (TID) parameter, an address identifier (AID) parameter, and like command syntax parameters). It should be noted that the processing required to determine the at least one network component for which the at least one command is destined may vary based upon network component type, command type, and like factors.

At step 318, each of the at least one command is validated according to at least one associated attribute. In one embodiment, the at least one associated attribute may comprise at least one of: at least one command source attribute, at least one network component attribute, and at least one command attribute. In one embodiment, a command attribute may comprise information associated with a command. For example, the at least one command attribute may comprise at least one of a command type, a command structure, and a command parameter value.

In one embodiment, a command source attribute may comprise information associated with a command source. In one such embodiment, a command source attribute may comprise a command source type (such as a provisioning system, a service management system, a network management system, a billing system, and like command source types). For example, a router configuration command initiated from a billing system may be deemed invalid, while a router reconfiguration command issued from a provisioning system may be deemed valid. Similarly, for example, a user profile database query command issued from a network inventory system may be deemed invalid, while a PSAP update command issued from a service provisioning system may be deemed valid.

In one embodiment, a network component attribute may comprise information associated with a network component. In one such embodiment, a network component attribute may comprise a network component type (such as a core element, a border element, a media server, a CALEA server, a CAC, a NRE, and like network component types). For example, a user profile update initiated towards a media server may be deemed invalid, while a congestion control software deletion command initiated towards a CAC may be deemed valid. Similarly, for example, any command issued towards a NRE may be deemed invalid, while a router configuration change command initiated towards a CE 110 may be deemed valid.

As described herein, a command attribute may comprise a command type. In one such embodiment, validation of the at least one command may comprise processing the at least one command for identifying at least one respective actual command type, and comparing the at least one respective actual command type to at least one associated valid command type. For example, a command type may comprise a "show running-config" command, a "configure terminal" command, an "ip ospf cost" command, a "clear ip bgp" command, a "metric maximum-hops" command, a "router igrp" command, and like command types.

As such, initiation of an "ip ospf cost" command towards a CE that is not utilizing Open Shortest Path First (OSPF) routing may be deemed invalid. Similarly, initiation of a "metric maximum-hops" command towards a router not running an Interior Gateway Routing Protocol (IGRP) may be deemed invalid. Alternatively, initiation of a "show running-config" command towards a BE 112 may be deemed valid. Similarly, initiation of a "metric maximum-hops" command towards each of the CEs 110 may be deemed valid.

As described herein, a command attribute may comprise a command structure. In one such embodiment, validation of the at least one command may comprise processing the at least one command for identifying at least one respective actual command structure, and comparing the at least one respective actual command structure to at least one associated valid command structure. For example, a command structure may comprise a command type and at least one associated command parameter required in order to execute that command type, such as "clear ip bgp [address]" where [address] comprises a router address command parameter, "ip ospf cost [cost]" where [cost] comprises an ospf cost command parameter, and like command structures associated with each command type.

As such, initiation of the command "ip ospf cost 120 100" may be deemed invalid since the valid command structure requires one command parameter value ("[cost]") and the command comprises two parameter values (e.g., "120" and "100"). Similarly, initiation of the command "metric maximum-hops 192.68.10.0 100" may be deemed invalid since a valid "metric maximum-hops" command does not allow specification of the IP address "192.68.10.0" as a portion of the command structure. Alternatively, initiation of a command "clear ip bgp 192.168.10.0" may be deemed valid since the "clear ip bgp" command structure (i.e., syntax) is valid. Similarly, initiation of the command "ip ospf cost 120" may be deemed valid since the "ip ospf cost" command structure is valid.

As described herein, a command attribute may comprise a command parameter value. In one such embodiment, validation of the at least one command may comprise processing the at least one command for identifying at least one respective actual command parameter value, and comparing the at least one respective actual command parameter value to at least one associated valid command parameter value. For example, command parameter value may comprise a specific value populated within the command syntax according to the required command structure, such as the command "clear ip bgp 192.168.10.0" where 192.168.10.0 comprises an address of a specific router, "ip ospf cost 120" where 120 comprises an ospf cost value, and like command parameter values populated in commands.

As such, initiation of a command such as "clear ibgp 1929.68.10.0" may be deemed invalid since the first octet (i.e., "1929") of the "[address]" command parameter value "1929.68.10.0" comprises an invalid value. Similarly, initiation of a command such as "metric maximum-hops 400" may be deemed invalid since the "[hops]" command parameter value 400 falls outside the range of valid "[hops]" command parameter values (i.e., from 1 to 255). Alternatively, initiation of a command "ip ospf cost 80" may be deemed valid since the "[cost]" command parameter value "80" falls within the range of valid "[cost]" command parameter values. Similarly, initiation of a "set metric 64 200000 255 255 64" command may be deemed valid since each of the "set metric" command parameter (i.e., bandwidth=64, delay=200000, reliability=255, loading=255, and mtu=64) value fall within the respective valid command parameter value ranges.

At step 320, a determination is made as to whether each of the at least one command is valid. If a command is not valid (and is therefore not executable on the associated network component), method 300 proceeds to step 322. At step 322, an invalid command message is transmitted towards the command source from which the command was received, and method 300 then proceeds to step 324. At step 324, a determination is made as to whether a new command is to be issued. If a new command is not to be issued, method 300 proceeds to step 340. If a new command is to be issued, method 300 returns to step 314. If the command is valid (and is therefore approved for execution on a network component), method 300 proceeds to step 326.

At step 326, each validated command is transmitted towards the at least one network component for which that validated command is destined. As depicted with respect to FIG. 1, at least one network component may comprise at least one of the CEs 110, BEs 112, RSs 120, SEs 130, and like network components associated with IP network 102. At step 328, each validated command is logged (i.e., stored) in at least one of a memory, database, and like storage components suitable for logging commands as known in the art. At step 330, each network component towards which a validated command was transmitted receives the validated command. At step 332, each network component receiving a validated command executes the validated command.

At step 334, each network component executing a received command generates and transmits at least one command response message associated with each executed command. In one embodiment, the at least one command response message indicates whether execution of the associated command was successful. For example, with respect to FIG. 1, at least one of the CEs 110, BEs 112, RSs 120, and SEs 130 may generate and transmit a corresponding command response message towards GS 106 for each command executed by each of the network components.

At step 336, the at least one command response message is received. In one embodiment, the at least one command response message is received by GS 106. At step 338, the at least one received command response message is transmitted towards the command source from which the associated command originated. In one embodiment, in which initiation of a single command via the command source resulted in generation, transmission, and execution of a corresponding plurality of commands, GS 106 may process the corresponding plurality of command response messages in order to initiate a single command response message towards the associated command source. It should be noted that such processing may significantly reduce the number of command response messages transmitted by GS 106 and received and processed by each of the OSSs 108.

At step 340, a determination is made as to whether the authenticated command source terminates the session with GS 106. For example, in one embodiment, the authenticated command source may terminate the session by automatically logging out of GS 106 upon completion of a cron job. Similarly, a user may log out of GS 106 via one of the OSSs 108 by selecting a "LOGOUT" button from an associated user interface. If the authenticated command source does not terminate the session, method 300 returns to step 324, at which point a determination is made as to whether a new command is to be issued, as described hereinabove. If the authenticated command source does terminate the session, method 300 proceeds to step 342, where the method 300 ends.

It is contemplated that at least a portion of the described functions may be combined into fewer functional elements/devices, may be performed by other functional elements, or that the various functions may be distributed across the functional elements in a different manner. For example, at least a portion of the functionality described herein with respect to GS 106 may be distributed across the OSSs 108. Furthermore, at least a portion of the functionality described herein with respect to GS 106 may be implemented using a plurality of GSs.

Furthermore, transmission of the network component access request, authentication successful, authentication failure, invalid command, command response, and like messages associated with the present invention may be communicated using various combinations of communications protocols such as Session Initiation Protocol (SIP), Simple Network Management Protocol (SNMP), Common Management Information Protocol (CMIP), Extensible Markup Language (XML), Transaction Language One (TL1), and like communications protocols as known in the art.

Figure 4:
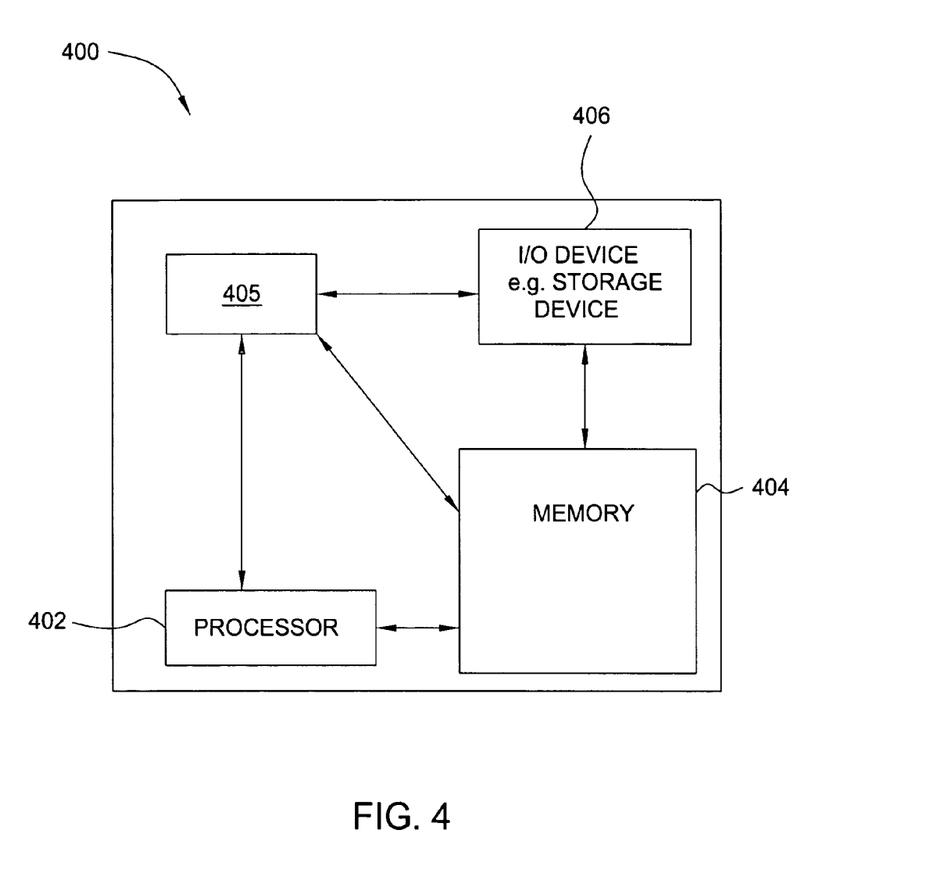
FIG. 4 depicts a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a network component access and command validation module 405, and various input/output devices 406 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present network component access and command validation module or process 405 can be loaded into memory 404 and executed by processor 402 to implement the functions as discussed above. As such, the present network component access and command validation process 405 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for validating a command, comprising:
   receiving, by a processor, the command, wherein the command is associated with a command source;
   processing, by the processor, the command for determining a network component for which the command is destined;
   validating, by the processor, the command according to an attribute, wherein the attribute is associated with the command source, wherein the attribute comprises a command source attribute that is used to determine whether the command is valid in view of a type of the command source, wherein the type of the command source indicates a particular type of command source selected from a group comprising of a provisioning system, a service management system, a network management system, and a billing system, wherein the validating the command comprises:
      processing the command for identifying a respective actual command structure;
      comparing the respective actual command structure to a valid command structure; and
      transmitting, by the processor, the command towards the network component in response to a determination that the command is valid.

2. The method of claim 1, wherein the attribute further comprises a command attribute.

3. The method of claim 2, wherein the command attribute comprises a command type.

4. The method of claim 1, wherein the validating the command further comprises:
   processing the command for identifying a respective actual command type; and
   comparing the respective actual command type to a valid command type.

5. The method of claim 4, wherein the valid command type is determined according to a network component type associated with the network component.

6. The method of claim 1, wherein the valid command structure is determined according to a network component type associated with the network component.

7. The method of claim 1, further comprising:
   transmitting an error message towards the command source in response to a determination that the command is invalid.

8. The method of claim 1, further comprising:
   receiving a command response associated with the command; and
   transmitting the command response towards the command source.

9. The method of claim 1, further comprising:
   authenticating the command source.

10. The method of claim 9, wherein the authenticating the command source comprises:
    receiving a network component access request associated with the command source; and
    authenticating the command source according to an authentication parameter.

11. A non-transitory computer readable medium storing a plurality of instructions which, when executed by a processor, cause the processor to perform operations, the operations comprising:
    receiving the command, wherein the command is associated with a command source;
    processing the command for determining a network component for which the command is destined;
    validating the command according to an attribute, wherein the attribute is associated with the command source, wherein the attribute comprises a command source attribute that is used to determine whether the command is valid in view of a type of the command source, wherein the type of the command source indicates a particular type of command source selected from a group comprising of a provisioning system, a service management system, a network management system, and a billing system, wherein the validating the command comprises:
       processing the command for identifying a respective actual command structure; and
       comparing the respective actual command structure to a valid command structure; and
       transmitting the command towards the network component in response to a determination that the command is valid.

12. The non-transitory computer readable medium of claim 11, wherein the attribute further comprises a command attribute.

13. The non-transitory computer readable medium of claim 12, wherein the command attribute comprises a command type.

14. The non-transitory computer readable medium of claim 11, wherein the validating the command further comprises:
    processing the command for identifying a respective actual command type; and
    comparing the respective actual command type to a valid command type.

15. The non-transitory computer readable medium of claim 14, wherein the valid command type is determined according to a network component type associated with the network component.

16. The non-transitory computer readable medium of claim 11, wherein the valid command structure is determined according to a network component type associated with the network component.

17. A system for validating a command, comprising:
    a processor; and
    a non-transitory computer readable medium storing a plurality of instructions which, when executed by the processor cause the processor to perform operations, the operations comprising:
       receiving the command, wherein the command is associated with a command source;
       processing the command for determining a network component for which the command is destined;
       validating the command according to an attribute, wherein the attribute is associated with the command source, wherein the attribute comprises a command source attribute that is used to determine whether the command is valid in view of a type of the command source, wherein the type of the command source indicates a particular type of command source selected from a group comprising of a provisioning system, a service management system, a network management system, and a billing system, wherein the validating the command comprises:
          processing the command for identifying a respective actual command structure; and
          comparing the respective actual command structure to a valid command structure; and
          transmitting the command towards the network component in response to a determination that the command is valid.

18. The method of claim 1, wherein the attribute further comprises a network component attribute.

\* \* \* \* \*